United States Patent [19]

Gat

[11] Patent Number: 5,008,548
[45] Date of Patent: Apr. 16, 1991

[54] PERSONAL UV RADIOMETER

[76] Inventor: Nahum Gat, 1227 9th St., Manhattan Beach, Calif. 90266

[21] Appl. No.: 388,115

[22] Filed: Aug. 1, 1989

[51] Int. Cl.⁵ ............................................... G01J 5/32
[52] U.S. Cl. ..................................................... 250/372
[58] Field of Search ........................... 250/372, 370.07

[56] References Cited

U.S. PATENT DOCUMENTS

| | | | |
|---|---|---|---|
| 3,710,115 | 1/1973 | Jubb | 250/83.3 |
| 3,878,498 | 4/1975 | Erickson | 250/336 |
| 3,917,948 | 11/1975 | Strutz | 250/372 |
| 4,229,733 | 10/1980 | Tulenko | 340/500 |
| 4,279,254 | 7/1981 | Boschetti | 128/395 |
| 4,348,664 | 9/1982 | Boschetti | 340/500 |
| 4,535,244 | 8/1985 | Burnham | 250/372 |
| 4,608,492 | 8/1986 | Burnham | 250/372 |
| 4,704,535 | 11/1987 | Lieber | 250/372 |

OTHER PUBLICATIONS

Sunsor, Inc; "Sunsor Technical Report Condensed", Copyright 1988, 2 pages.
International Light, Inc; UV Curing Radiometer, Cataloge Cover and 1 page.
UVP, Inc; UVX Radiometer; Back page & 1 page.

Primary Examiner—Jack I. Berman
Assistant Examiner—Richard Hanig
Attorney, Agent, or Firm—Ronald M. Goldman

[57] ABSTRACT

A miniaturized portable battery operated combined power/energy radiometer appropriate for personal use provides a convenient means for determination of the direction of maximum radiant UV power and the measurement of the total energy over time or dosage. The radiometer possesses particular usefulness for sunbathers, walkers, and other persons who are exposed to ambient radiation. Suitably the radiometer includes means for attachment to an article of clothing and/or a positionable stand.

36 Claims, 2 Drawing Sheets

PERSONAL UV RADIOMETER

FIELD OF THE INVENTION

This invention relates to devices for monitoring exposure to radiation in the ultra-violet light spectrum, and, more particularly, to a portable microprocessor controlled Ultraviolet radiometer for determining the direction of and monitoring incident radiation and for providing an alarm upon attainment of a preselected exposure limit.

BACKGROUND

Various artificial ultraviolet radiation sources have been used in industrial and medical applications. The output of such radiation sources is well characterized in terms of the power and spectra and is fairly constant through the life time of the source. In contrast, solar radiation reaching Earth consists of electromagnetic waves across the spectrum from ultraviolet (UV) through visible light, to infrared (IR). The UV radiation (UVR) is further subdivided. UV-C, from about 200 to 285 nanometers in wavelength, is totally absorbed in the atmosphere before reaching Earth. UV-B, from about 285 to 318 nanometers, contains only a few percent of the total solar ultraviolet light energy generated, and is considered the cause of skin cancer in humans. UV-A, from about 315 to 400 nanometers, is mostly responsible for tanning; but it plays some role in skin cancer and is also the cause of eye cataracts, solar retinitis and corneal dystrophies. In addition, the interaction between UV-B and UV-A radiation is suspected to have a synergistic skin cancer causing effect Moreover, this combined ultra-violet radiation is a cause for skin aging and wrinkling.

The medical profession appears to have well documented such biological effects. However, because of the variability between individuals, exposure levels which may cause significant damage to one person may be benign to another. Further, a safe exposure level in terms of skin cancer may nevertheless cause eye damage or effect skin aging. For those who choose to seek exposure to obtain skin tanning for cosmetic purposes without most of the other negatives, despite published medical warnings to refrain from such an activity, it is helpful if such persons may regulate the amount of exposure with more quantitative and qualitative means other than simply through guessing Of prime importance is the cumulative power on the sensitive area, the energy received.

The general principles and techniques for radiometry, photometry and spectroradiometry have long been known and are adequately described in the technical literature. Based on such principles many ultraviolet radiation measuring and alarm instruments have been developed and have been available commercially for many years and others appear in the patent literature. Some use radiation-sensitive photo-chromic chemicals, others use UV-induced fluorescent properties of material, and yet others use photoconductive or photovoltaic cells. These may be considered briefly.

A reusable radiation monitor based on photochromic chemicals, described in U.S. Pat. No. 4,130,760 to Fanselow and a similar one-time monitor marketed by Lucas Products of Toledo Ohio contains a display that changes color when a predetermined cumulative energy threshold is exceeded. The monitor does not, however, display a quantitative value for the radiation. An electrochemical integration scheme, described in U.S. Pat. No. 4,372,680 to Adams et al, uses two photocells in a differential mode in order to obtain a cumulative readout of Ultraviolet Radiation. This device likewise does not display quantitative value of the radiation. In addition it requires a separate readout device for determination of the electrochemical cell status. Thus such devices appear unsuitable for applications in which the real-time radiation intensity and energy level readings are of interest as in the case of the present invention. Further, such devices cannot be used to determine the direction of maximum radiation and such determination must be made intuitively.

Another UV dosimeter presented in U.S. Pat. No. 4,403,286 to Presby, utilizes the fluorescence induced in the core of optical fibers which is then monitored by a visible light detector. Yet another meter, the "Robertson-Berger" or R-B meter, simulates the human skin response to Ultraviolet Radiation, and uses phosphor excitation by the UV-B radiation band and a visible light detector. This meter, described in "A Climatology of Sunburning Ultraviolet Radiation," by D. Berger and F. Orbach, (Photochem. & Photobiol. Vol. 35, pp. 187-192, 1982), also provides a cumulative dosage reading in peculiar units which cannot be easily transformed to the common energy units.

The need for a useful personal dosimeter as would provide assistance to those who wish to protect their skin or eyes is amply recognized in the patent literature. Thus U.S. Pat. No. 3,710,115 granted Jan. 9, 1973 to Jubb for a Sunburn Warning Device teaches a combination for providing an alarm upon attainment of a predetermined dosage or energy level received at the radiation sensor, doing so by integration of the sensor signal. Concurrently an analogue meter provides continuous display of the dosage level attained.

U.S. Pat. No. 3,878,496 granted Apr. 15, 1975 to Erickson for a Selectable Level Alarming Personal Dosimeter presents a personal radiation dosimeter, that warns of excessive radiation dosage, in this case atomic radiation, and also alerts the user if there is a rapid increase in level as would likely rapidly lead to the dosage limit. Erickson's device incorporates the technique of electronic counting as the means to determine dosage, as an alternative to direct electronic integration.

A similar approach is described in U.S. Pat. No. 3,917,948 granted Nov. 4, 1975 to Strutz for a UV dosage monitoring and alarm device combination. In the radiometer circuits a signal is generated whose pulse repetition rate is proportional to the intensity of UV radiation detected by the sensor; and the circuit electronically counts such pulses and uses the count as a representation of accumulated energy.

Further, U.S. Pat. No. 4,535,244, granted Aug. 13, 1985 to Burnham discloses a portable dosimeter that contains a sensor, a microprocessor and a display, wherein an alarm may be given upon attainment of a preselected dosage. A keyboard is included to allow selection of the desired dosage level. Another selection allows user adjustment to take into account the use of sunscreen material, the SPF factor. Electronic circuits divide the accumulated dosage by a factor that corresponds to the solar protection factor value entered by the user via the keyboard.

Burnham's dosimeter is improved upon as described in U.S. Pat. No. 4,608,492, granted Aug. 26, 1986 to Burnham by adding to a personal UV dosimeter combination a circuit for advising the user if the UV sensor is obscured by the user or malfunctions. Thus, if sequential readings of the sensor differ substantially from one moment to the next, which represents either failure of the pickup cell or an inadvertent movement by the user obscuring or covering the radiation sensor, an alarm condition is signalled.

U.S. Pat. No. 4,704,535, granted Nov. 3, 1987 to Lieber, et al presents construction details for a novel UV sensor intended for use in a portable UV dosimeter. A specific filter blocks the Infrared radiation from reaching the photocell.

U.S. Pat. No. 4,229,733 granted Oct. 21, 1980 to Tulenko et al for an Exposure Detecting Device discloses another personal UV alarm combination, one with an added feature that automatically adjusts for "recovery". Thus even though the accumulated dosage is of a certain level, if one leaves the sun and commences recovery, the circuit simulates that action and subtracts prescribed amounts from the stored accumulated levels; commencing again when the unit is again subjected to the radiation.

With the foregoing background in the patent literature, one may consider an aspect of solar radiation that the identified patents overlook. Global ultraviolet radiation exposure is composed of direct solar radiation; that is, radiation traveling in-line with the sun, and indirect radiation, that is radiation scattered and reflected from all other angles, and that combination is strongly affected by several factors. Environmental conditions, such as clouds, humidity, haze and fog, seasonal local and global variations in the ozone layer, all contribute to the scattering and blocking to a various degree of the direct ultraviolet radiation. Geographic parameters such as latitude, altitude, and solar zenith angle, determine the path length through the atmosphere and the resulting attenuation of the direct radiation. A portion of the scattered ultraviolet radiation due to these effects also reaches Earth at oblique angles. The ambient surroundings such as surface type (water, snow, sand, concrete, glass, etc) and the topography determine the reflection of ultraviolet radiation. A part of this reflected ultraviolet radiation is again scattered in the atmosphere and returned to Earth. Such complex interplay affects the total radiation exposure to which a person is subjected. Thus it may be appreciated that not only is it impractical to predict the direction and amount of maximum total radiation but it is also difficult as to how to measure. For example one may recall the well known fact that a person sitting on the beach under a parasol may still incur a severe sunburn due to the ultraviolet radiation reflected from the sand and water.

In order to obtain the best assessment of exposure to ultraviolet radiation, there thus exists a need to determine the direction from which the maximum radiation arrives and then to point the radiometer in that direction. Though personal dosimeters are extensively considered in the described patent literature, those patents and the disclosed technology fail to appreciate a need for the sunbather or other person who is trying to avoid exposure, such as the beach enthusiast who sits under a parasol, to orient the dosimeter in the direction of maximum power and therefor fail to include appropriate means for enabling the user to make that determination. Guessing is clearly unreliable.

The failure of the patent literature to recognize this need is also reflected in the available instrumentation for industrial or commercial use. Electronic apparatuses for measuring radiation power are not new. For example, one such power measuring instrument has been available for many years from the Solar Light Co. of Philadelphia Pa. Using that instrument it is possible to locate the direction of maximum radiation power in application addressed in this application given the teaching and using the method herein described. Thus given the present teaching one might employ available commercial instruments, based on the said R-B meter, which measures radiation intensity, instantaneous power of Ultraviolet Radiation in relative units, although not in absolute units of power, and use the R-B meter together with one of the personal dosimeter devices shown in the patents earlier described or with one of the other kinds of commercial instruments that measures dosage in relative units.

Commercial industrial instruments of the foregoing type operate either as a power meter or an energy meter, but none performs both functions. Most are large in size, heavy, require electricity to operate and thus are believed to be impractical for use as a personal portable device. Indeed because of the large size of those commercial units, the sensor unit is in many cases attached with an electrical cord to the measuring unit so that the sensor may easily be moved around and positioned. The foregoing commercial instruments alone or in combination do not appear to serve as a portable self contained radiometer that may be used by sunbathers to monitor ultraviolet radiation energy and power.

Accordingly, an object of this invention is to provide an improved personal miniaturized radiometer for ultraviolet radiation detection and measurement that allows the user to keep record of cumulative exposure over prolonged periods of time.

A further object of the invention is to provide an easy to use inexpensive portable radiation dosimeter that provides an effective dosage alarm as should warn of impending overexposure to any portion of the user's body.

A still further object of the invention is to provide a relatively inexpensive and compact radiation dosimeter structure using readily available technology and capable of manufacture by mass production techniques.

An ancillary object of the invention is to provide a personal dosimeter that may be carried by the person and has wide versatility, permitting the user to set the mode of display in absolute units or in terms of percentage or relative units as desired for any particular application.

SUMMARY

The present invention provides a method and apparatus that enables a user to both determine the direction of highest intensity of incident radiation and measure the amount of that incident radiation or dosage. An alarm may be actuated upon attainment of a predetermined dosage level set by the user. Adjustment may be made for skin type and/or other factors.

A UV radiometer in accordance with the foregoing objects is characterized by light-weight small portable unit that may be carried in use on the arm or pinned to the garment. The radiometer contains a radiation sensor, power meter means for displaying radiation intensity and dosage meter means for displaying radiation dosage. Both such meter means are operated from the same radiation sensor with the sensor providing an input representative of the level of radiation incident thereon simultaneously to both meter means. Preferably the visual indicators associated with each meter means are physically located proximate one another so that information provided by each meter means may be observed simultaneously.

The radiometer may be moved by the user and oriented in various directions to scan incident radiation in all directions, enabling a determination of the direction of maximum radiation power, the preferred direction. The user may then retain the radiometer in the preferred direction and continuously monitor dosage.

In a more specific and accessory aspect the radiometer may include in combination therewith an adjustable stand carried by the monitor or separate therefrom as an accessory to hold the dosimeter in the preferred direction, freeing the user to sunbathe and move without disturbing radiation monitoring.

In a further aspect the dosimeter includes an alarm which announces when a threshold level of energy has been exceeded. A user operable selection switch permits adjustment of this threshold level to the user's specifications. The invention allows one to preset an audible alarm by entering personal preference such as skin type and/or sun protective factor (SPF) in one embodiment to provide a visual readout indicating the percentage of energy exposure out of a desirable, or, perhaps, medically recommended, maximum, and also to keep track of cumulative exposure over prolonged period of use, up to several months or a year.

An advantage to the invention is that the invention monitors the ultraviolet radiation over the complete range of biological effects, from 285 to 400 nanometers, and displays that information in common engineering units. The spectral range of radiation level and the use of engineering units, typically milli-Joules per square centimeter (mJ/cm2), provide for a more versatile unit.

The processing circuits used in the invention are preferably implemented with a single semiconductor "chip" in a custom integrated circuit (IC) utilizing VLSI CMOS technology and incorporating analog and digital circuitry to improve reliability and eliminate all extraneous electrical components, a decided advantage. That CMOS structure creates a power consumption level low enough to extend the battery life time to nearly the shelf-life of the battery. This minimizes the need for frequent battery replacement and better serves the user.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figure 1:
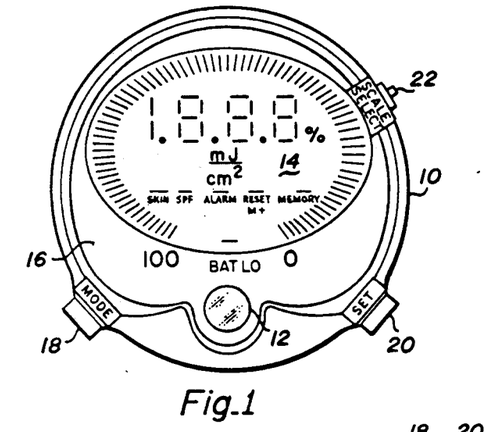
FIG. 1 is a pictorial front view of a preferred embodiment of the invention.

Referring to FIG. 1, an embodiment of the radiometer according to the invention is presented in a top elevation view in a preferred physical arrangement that readily demonstrates its compact and portable structure. The embodiment includes a protective case 10, a window 12, which serves as an entrance for incident radiation to the underlying photocell, not illustrated in the figure, and a liquid crystal display (LCD) 14, serves as a data display and control console. As shown the display includes multi-segment digit numeric display, a bar graph, and various other indicators for clear view, the details of which are described later in this specification. Case 10 is covered with a printed cover 16 which is glued or otherwise sealed to create a water-tight seal therebetween. The printed cover 16 contains clear zones in the areas overlapping the LCD 14 and the window 12. The clear zone over the window is transparent to the full range of ultraviolet radiation of interest and the specific transmission characteristics are accounted for when calculating the ultraviolet radiation power. The radiometer may be of a physical size as permits the radiometer to be held in the hand and in alternative embodiments may be smaller so as to be carried on the wrist.

The radiometer contains three control and data entry keys; a mode selection key 18, a set key 20 and a scale select key 22. The keys are conveniently arranged at spaced locations about the periphery of case 10 as is illustrated. The operation of these keys is further described hereafter.

Figure 2:
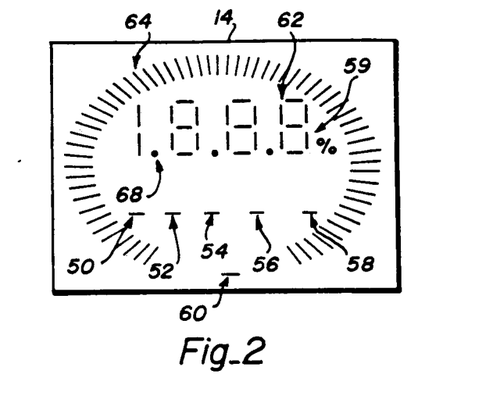
FIG. 2 shows the details of the liquid crystal data display and control console used in the preferred embodiment.

The LCD is separately illustrated in FIG. 2 in top view and is seen to be of a generally rectangular shape and is of conventional electronic structure. It is fabricated by conventional techniques to form the indicators identified in a pattern, such as the preferred pattern illustrated. In order to minimize the overall size of the radiometer, the LCD 14 serves as a control console to display commands entered by the user. The LCD contains several annunciators or indicator lights 50, 52, 54, 56, 58 and 59 which are controlled by the function keys 18, 20 and 22 as elsewhere herein described. Indicator light 60 is lit when the controller senses a low battery power requiring battery replacement. The LCD 14 also contains a three and one-half digit multi-segment numerical display 62, with auto-ranging decimal point 68, which indicates the cumulative energy measured by the radiometer or, alternatively, indicates the fraction of energy out of the total exposure desired by the user and that the user selected by appropriate operation of the function keys. The choice is also user selectable.

Figure 3:
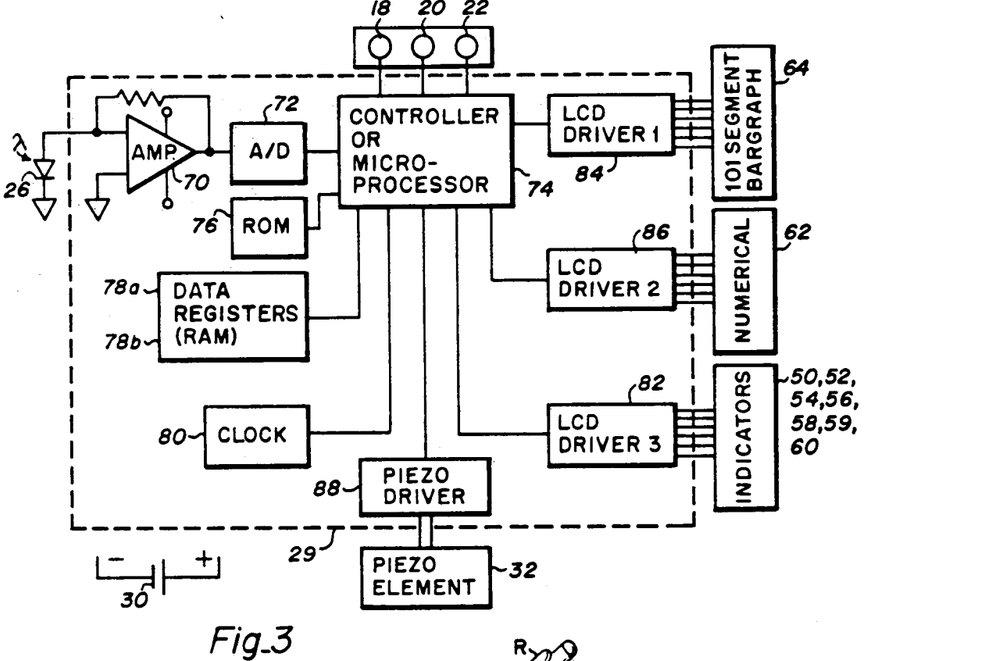
FIG. 3 illustrates in block diagram form the electronic elements and circuits in the embodiment of FIG. 1.

Reference is made to FIG. 3 which illustrates the embodiment in block diagram form. Preferably the electronic elements of the circuits that process the signal from photocell 26 is in the form of an integrated circuit, IC chip, generally represented by the rectangular dash line outline 29 surrounding the specific elements hereafter identified.

PV cell 26 is connected to the integrated circuit. The photocell may be any one of a variety of types. Most commonly used by those familiar with the art of optical radiometry are selenium, cadmium selenide, or lead-selenide cells. Such cells however are sensitive to a radiation spectrum broader than UV and, therefore, require a filter to be positioned in between the cell and the incident light to block the undesired radiation from reaching the detector's sensitive area. A variety of silicon cells can be used in a similar manner. A preferred approach is to use a gallium phosphate cell, which is insensitive to IR radiation thus eliminating the need for a complex filter. Another preferred approach is to use a "blue" silicon cell which is also insensitive to radiation outside the UV spectrum or beyond 400 nanometers. Use of this latter eliminates completely the need for a filter and is preferred. The electrical signal generated by the PV cell 26 requires initial amplification.

The IC 29 contains a preamplifier 70 coupled to the output of the photocell to provide the required signal amplification. The preamplifier is also specifically designed to maintain linearity of the radiometer. An analog to digital converter (A/D) 72, preferably having an accuracy of at least 8 bits is coupled to the output of preamplifier 70, and a controller 74, which controls and monitor all operations has an input connected to the output of A/D 72.

Controller 74 is a conventional programmed microprocessor well known to those skilled in the electronics arts. The microprocessor contains a read-only memory, ROM, 76; random access memory, RAM, 78; a clock, 80; inputs and outputs. The ROM contains the program or operating system as prescribes the electronic action taken by the microprocessor and the protocol, therefore, such as initialization, checking the inputs, processing the input information, and supplying the outputs, such as the outputs to the display drivers. The processor is programmed to perform the input, processing and output functions described.

At the various inputs controller 74 receives the amplified and digitized output signal of photocell 26 and the keyed-in commands from mode, set and select keys 18, 20 and 22, respectively. The controller also drives the digital display 62, the bargraph 64, all the indicator lights 50, 52, 54, 56, 58, 59 and 60 and the piezo element 32 by means of the drivers 84, 86, 82 and 88, which are all of conventional structure, and all of which could be combined into a single driver in alternative practical embodiments. Preset default values and commands are stored in the firmware part of the IC (ROM) 76. Also stored in ROM is a calibration factor that accounts for the spectral characteristics of the PV cell and the transparent window material. As those skilled in the art appreciate, the particular stored values will vary, depending upon the kind of cell chosen as the radiation sensor. User inputs of skin type and SPF factors are multiplied and the result is stored in a RAM register 78a. This result is accessed by the controller at the proper cycle of operation and is multiplied by the value input from the photocell. Another RAM register 78b is used to keep track of cumulative exposure energy. Every time the display is reset to zero the value of the readout is added to this memory register called the M+ register.

The controller constantly monitors battery 30 voltage. Once the voltage drops below a preset value the indicator light 60 is lit to warn the user that a new battery may be required soon. The timing signal for the control function comes from an internal LC oscillator 80, as is conventional, which could be replaced by an external crystal oscillator if desired.

A controller or, more appropriately, microcontroller, according to at least one dictionary, is an electronic device that controls a process with high resolution, usually intended to have limited capability. In the preferred form the microcontroller is a micro-programmed machine, such as a microprocessor or a microcomputer. Those skilled in the art recognize the lack of clarity and overlap in definition in the classification of electronic devices variously referred to as microcontroller, microprocessor, and microcomputer. For purposes of the present invention, it is recognized that those devices are equivalent within the combination herein described and those terms may be used interchangeably in this specification and in the appended claims.

Many are familiar with miniaturized electronic wristwatches, calculators, hand held computers, calendar, timer, and watch combination devices and the like, which in common as of the present day with the disclosed invention, contain liquid crystal displays and programmed microprocessor controlled circuits, having ROM and RAM and containing suitable keys or switches for allowing the user to select functions to be accomplished from a menu provided by a display. The block diagram of the circuit together with the specified functions hereafter described sufficiently describe the hardware and program to those skilled in the art.

Figure 4A:
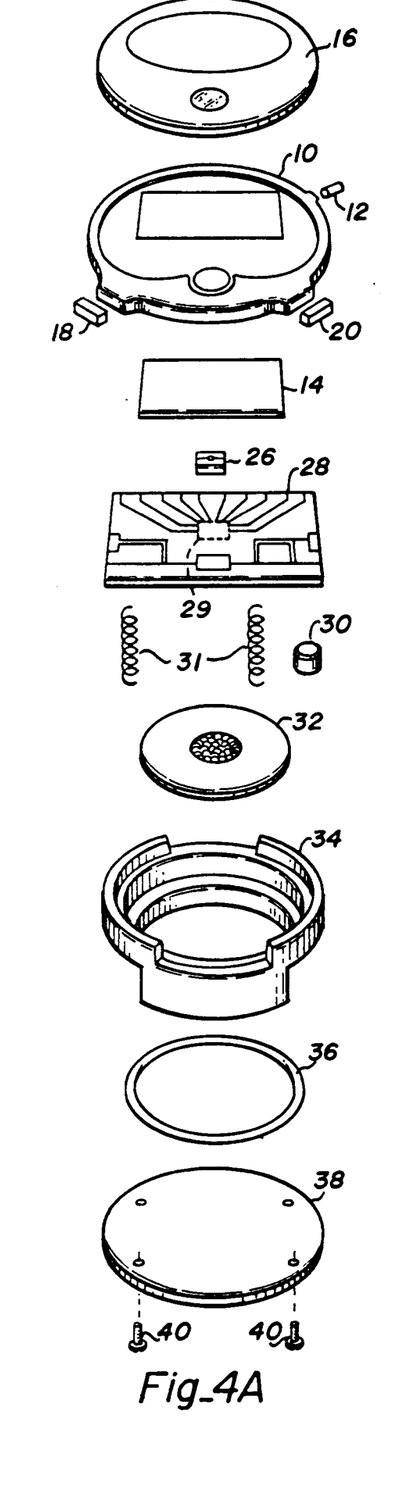
FIG. 4 is an exploded view showing the construction and packaging of the elements into the embodiment shown in FIGS. 1 and 3 and FIG. 4B is a partial section view of that embodiment drawn to a larger scale.

FIG. 4 is an exploded view of the radiometer which shows a preferred form in which the elements referred to in the preceding figures are packaged together into a unitary assembly. A two-sided printed circuit board (PCB) 28 serves for interconnecting all the electrical components. IC 29 is surface mounted to board 28 using ultrasonic, TAB or similar technique in order to reduce the overall size of the radiometer. These techniques are well known to those skilled in the art and therefore are not discussed further.

The photovoltaic (PV) cell 26 is likewise surface mounted to the printed circuit board. PV 26 is located below window 12 so that radiation passing through the window intercept the sensitive surface of the PV cell. The PV cell is mounted close enough to the surface of the window 12 to assure accurate "cosine" response, that is to assure the sensitivity of the radiometer is proportional to the cosine of the angle between the radiometer and the incident radiation. The LCD 14 maintains contact with the PCB 28 using conventional "zebra strips" which are well known to those skilled in the field of microelectronics. A piezo electric element 32 of wafer shape is positioned at a short distance from the PCB 28 and maintains electrical contact with it by means of two metal springs 31 which are bonded to the PCB 28. The circuit is powered by a conventional battery 30 which is positioned near the back cover 38 of the radiometer for easy access and replacement. The battery is pill shaped and of the kind used in small electronic devices such as LCD type wrist watches.

Figure 4B:
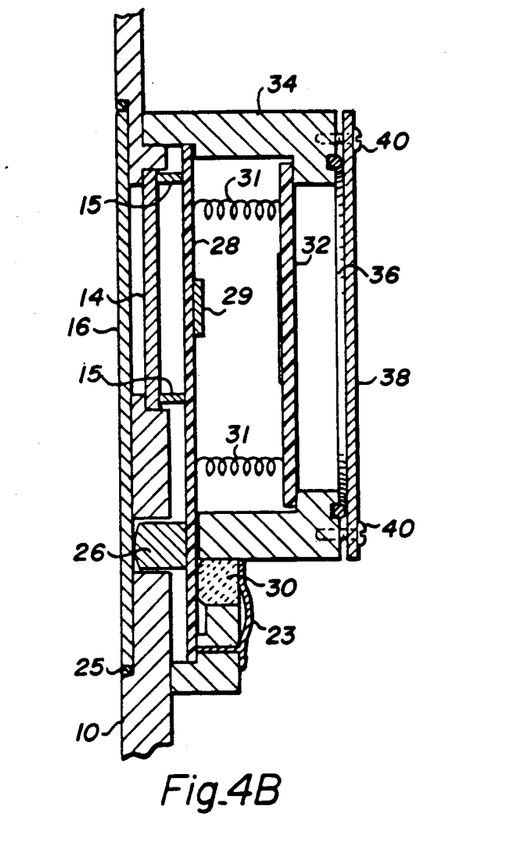

Fixture 34 is designed to hold together as a single unit, the PCB 28, piezo element 32, battery 30, and mate with the case 10. A conventional rubber or plastic seal in a shape of an "O ring" forms a water-tight closure between the case 10 and the back cover 38 which is tightened using screws 40. The elements are sandwiched together into the case. The relationship is illustrated in partial side view in FIG. 4b in which the elements are identified by like numerals. A zebra strip contact 15 is shown located between LCD 14 and PCB 28. Rubber seal 25 is located between case 25 and cover 16 to form the water tight seal. Retainer 23, which is of metal and also serves as a battery contact, holds battery 30 in place.

In alternative embodiments, battery 30 may be of the rechargeable type, and additional photovoltaic cells may be included and used for the purpose of charging the battery 30, a well known circuit arrangement.

Referring again to FIGS. 1 and 3 the operation of the function keys, which together with the aid of the aforementioned indicator lights constitute the user-radiometer interface, are now described. The controller is interactive; that is, the ROM contains a stored series of menus each giving the user a choice that may be made. The user makes the choice by operating one of the keys, which the controller detects, comprehends, and implements. The mode key 18 when be pressed five consecutive times causes the radiometer controller to scroll through four different modes and a new menu is displayed at each mode. The fifth operation causes the return to the common operating mode.

While in each mode, the user may select an item or parameter listed in the menu displayed on the 3½ digit numerical display. The particular menu is identified by the indicator lights 50, 52, 54, 56, 58 and 59 on the LCD 14. The menu and the selectable parameters are more particularly and concisely described in the tables hereinafter presented and add to the definition of the structure.

5. Press MODE key (18) ONCE to return to the regular display.

As those skilled in the art appreciate the aforedescribed menus and the system operation is accomplished through the program installed in the microprocessor's ROM.

The user can initially obtain from the use of this invention a reading on the exposure energy level which he/she feels comfortable with; a level, for example, before sunburn occurs, or before eye irritation begins, say 20 mJ/cm2. Then, at other times instead of measuring stay period in the sun in units of time (for example 1 hour), the user can select the stay period in the sun in units of energy exposure, such as 20 mJ/cm2 in the given example. The advantage is that on one day 20 mJ/cm2 may be achieved in one hour. On another day, however, that level may be reached in only 20 minutes. Further, the user will be then able to follow a doctor's advice to stay in the sun for no more than, say, 15 mJ/cm2. Without this invention such prescription is not possible and the doctor may only prescribe amount of time in the sun rather than the more important parameter: the amount of ultraviolet radiation energy. Accordingly, the skilled reader realizes that the invention goes beyond the physical description of the preferred embodiment.

An advantage to the described structure is that the display of measurement may be made in terms of engineering units, such as millijoules. The use of engineering

| TABLE OF FUNCTIONS: |MODE| & |SET| KEYS | | | |
|---|---|---|---|
| PRESS MODE (18) KEY | INDICATOR OFF | INDICATOR ON | PRESS SET KEY (20) AND SCROLL THROUGH MENU |
| 1st time | none | SKIN TYPE(50) | 1,2,3,4,5 or 6 |
| 2nd time | SKIN TYPE(50) | SPF(52) | Select continuous digit from 1 to 100 |
| 3rd time | SPF(52) | ALARM(54) | Select ON or OFF |
| 4th time | no change | RESET+M(56) | Press once to reset count to 0 and to add count to memory. DON'T press to leave count unchanged. |
| 5th time | all* | none | none; returns to regular operating mode. |

| TABLE OF FUNCTIONS: |SCALE/MEMORY| KEY (22) | | | |
|---|---|---|---|
| Press SCALE/MEMORY key (22) | INDICATOR OFF | INDICATOR ON | ACTION |
| 1st time | none | % (59) | Main readout scale change to % of exposure level. |
| 2nd time | % (59) | MEMORY(58) | Main readout display cumulative energy count in memory. |
| 3rd time | MEMORY(58) | none | Return to normal display, session energy cumulative reading. |

*(except ALARM, 54, if selection ON was made in Step 3)

TO RESET MEMORY TO ZERO

1. Press MODE key (18) FOUR times (to display RESET M+ (56) indicator);
2. Press SCALE/SELECT key (22) TWICE to light MEMORY (58) indicator;
3. Press SET key (20) to reset memory to zero;
4. Press SCALE/SELECT key (22) ONCE to return to the regular display; and units is particularly advantageous since common medical units of, say, erythemal effect do not apply to eye damage. Similarly no units of measure appear to have been developed as yet to quantify the skin aging and wrinkling effect. Most persons are familiar with the common units of power, "watt," which are used for common light bulbs. Thus the electrical power consumed by a 100 watt bulb is 100,000 times larger than ultraviolet radiation level of 1 milliwatt (mW) falling over one square centimeter of body surface. When multiplied by the duration as measured in seconds the total energy is obtained; so that 1 mW/cm² over 1 hour gives 3600 mJ/cm².

With the settings installed, the user may then move the unit around, pointing the photocell pick up, the sensor, in various directions, while monitoring the level displayed on the bar graph. Once a maximum level is determined the sunbather may retain the sensor oriented in the determined direction, placing it on the sand or blanket, either propped up or through use of an adjustable stand, to continue monitoring that maximum light radiation. As the preferred form, the display of power received is continuous. By checking the bar graph display from time to time the user may note changes either up or down in radiation level. Suitably the user may then pick up the unit and again scan the surrounding area to determine the direction of maximum power to ensure that the direction has not shifted, or, if the direction has shifted, to re-orient the sensor accordingly.

Each functional portion of the circuit may be characterized as a meter, in the sense that it provides a visual or audible perceptible indication of amount being measured by the meter. Thus the power level indicating portion of the radiometer may be referred to as a power meter and the energy indicating portion of the circuit may be referred to as an energy meter or dosimeter, even though some electronic components used to process the signal inputted by the sensor are shared between those different meter functions. As is apparent the preferred form of meter is one with digital circuits and with a digital display. In less preferred forms the old fashioned less rugged analogue type display, one with a moving needle, could be employed.

Figure 5:
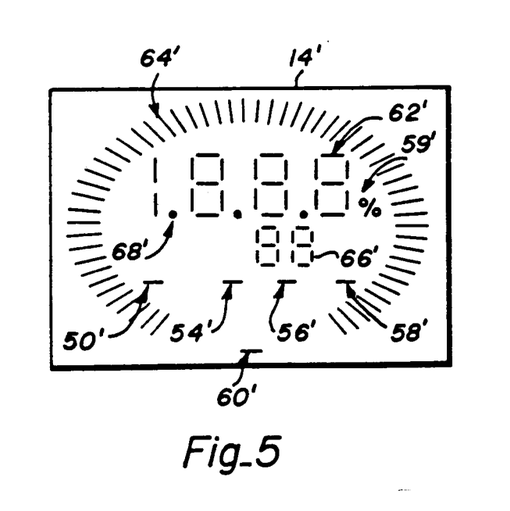
FIG. 5 is an illustration of a display for an alternative embodiment of the invention.

A more streamlined embodiment of the invention eliminates the need to incorporate the SPF indicator 52 and the related program. A liquid crystal type display for such alternative embodiment, comparable to the display of the first described embodiment is illustrated in FIG. 5, in which like elements are labeled by the number used for the corresponding element of the prior embodiment and is primed. A two digit multisegment display 66 is instead added with accompanying drivers and a portion of the ROM is used for a look-up table as herewith described. The system program is modified accordingly to incorporate the specification hereafter described.

The users inputting of information is accomplished the same way as in the prior embodiment, except that the mount of information that the user needs to program into the radiometer is reduced while the amount of information displayed is increased by incorporation of the additional two digit display. The user inputs only the skin type factor; the menu querying the SPF factor of the sunscreen lotion and program steps to accomplish that query and process the user's response is eliminated in this alternative embodiment.

In operation as the radiometer accumulates the amount of energy exposure, the controller uses a formula or, preferably accesses the "look up table" stored in the ROM and then displays the Sun Protection Factor, SPF, value required to limit the effect of that particular exposure level to one Erythmal unit, the level sufficient to cause a sunburn effect. Given that information the user, who is aware of the SPF of the skin lotion that is in use, mentally determines whether he is about to reach the sunburn level. That is, if the display is of an SPF of 8 and the user wears a lotion with an SPF of 10, the user knows there is a little more exposure required to reach the sunburn level for his skin type. If the display is of an SPF of 10 and the users lotion is also of an SPF of 10, the user knows that it is time to prevent further exposure.

The contents of a look up table in such an alternative embodiment may appear as follows:

LOTION SPF CORRELATION BY SKIN TYPE

| ENERGY LEVEL | SKIN TYPE 1 | SKIN TYPE 2 | SKIN TYPE 3 | ... | SKIN TYPE 6 |
|---|---|---|---|---|---|
| 1 | | | | | |
| 5 | | | | | |
| 10 | 1 | | | | |
| 15 | . | | | | |
| 20 | . | | | | |
| 25 | 4 | | | | |
| . | . | . | | | |
| . | . | . | | | |
| 50 | 8 | 4 | | | |
| . | . | . | | | |
| . | . | . | | | |
| 75 | 15 | 8 | 1 | | |
| . | . | . | . | | |
| 90 | . | . | . | | |
| 95 | 35 | 12 | . | | |
| 100 | . | . | 4 | | |
| . | . | . | . | | |
| . | . | . | . | | |

Assume person A who is of skin type 1 and another person B of skin type 3 sit together in the sun and accumulate an exposure reading of 75 with their respective radiometers. Person A requires a sunscreen with an SPF of 15 while person B requires one with an SPF of 1 in order to have proper protection against a sunburn. The values of 15 and 1 given in this example may be considered to be the exposure equivalent SPF values. If person A was using sunscreen with an SPF of 30, then that person receives only half the exposure which may cause sunburn. If on the other hand, that person uses a lotion with an SPF of 8 then the person has received twice as much exposure as that required to cause a sunburn.

The foregoing description concentrated on the person who sunbathes for cosmetic purposes because of the particular usefulness foreseen in that field. As those skilled in the art appreciate the invention is useful not only for sunbathers but in other fields as well. Medical applications include dermatology, phototherapy, suntanning, ophthalmology, virology and sterilization; industrial applications include solar simulation for material testing, semiconductor annealing, curing of adhesives, photoresist exposure and computer EPROM erasure. The common factor to the cited applications is the spectral range of radiation level and the use of engineering units, typically milli-Joules per square centimeter (mJ/cm2), for the measurement of that energy. The feature of portability and inexpensive construction allow for volume production and widespread application, making radiation monitoring possible in many applications where the expense of industrial and laboratory type units has heretofore limited accessibility; a shortage of supply requiring the equipment to be shared among many users, a burdensome procedure as known to those who try to borrow equipment in heavy demand by many potential users and one is confronted with a long waiting list.

The disclosed embodiment may be changed in many other ways as well. By way of additional example, the prior patent literature cited in the background of this specification include circuit features as provide an alarm when the sensor is inadvertently covered by the user. Another describes a circuit feature that provides an alarm feature when the accumulation of dosage is at a very rapid rate. These features may be incorporated in alternative embodiments of the invention and if incorporated may be incorporated in a manner as would allow the particular feature to be switched in circuit or out of circuit at the users option.

Figure 6:
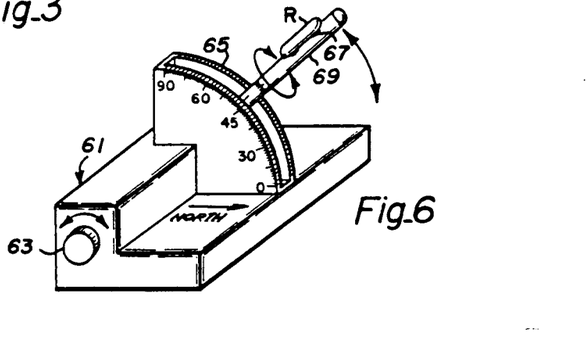
FIG. 6 illustrates an accessory stand that may be used with the preceding embodiments.

Reference is made to FIG. 6 which illustrates a support stand 61 with adjustable features as may be used with the invention. In this the radiometer R is fastened to a rod or arm 67 with Velcro strips. Rotatable knob 63 is used to position arm 67 at an elevation angle represented in scale 65 and arm 67 is rotatable about its axis to allow setting of the azimuthal angle. The stand permits the radiometer to be retained in the direction of maximum incident radiation.

In other embodiments, the radiometer may be supported by Velcro strips to the user's clothing or be combined with a wrist band and worn on the user's wrist for carrying and/or for use. Moreover, the adjustable stand described in connection with FIG. 6 may be automated; that is, it may be mechanized with suitable motors and sensors to "track" the direction of maximum radiation.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In the method of preventing overexposure of an object located in a three dimensional field of ambient ultraviolet radiation of the range of 250 to and including 400 nanometers in wavelength in which such radiation travels toward the object from a plurality of directions, said method including the steps of monitoring ultraviolet radiation dosage by means of a ultraviolet radiation dosimeter and removing or covering said object upon attainment of predetermined exposure to prevent significant additional radiation from reaching said object, the improvement in which the step of monitoring radiation dosage includes the steps of:

moving an ultraviolet radiation sensor about the space surrounding said object to determine the specific direction from which ultraviolet radiation of 250 through 400 nanometers in wavelength traveling toward said object is of a maximum intensity level;

retaining said radiation sensor oriented in said specific direction for a desired interval to monitor ultraviolet radiation dosage received by said object while said object remains exposed to said radiation field;

moving said ultraviolet radiation sensor about the space surrounding said object to re-determine the specific direction from which said ultraviolet radiation traveling toward said object is of a maximum intensity level after the lapse of said desired interval;

retaining said radiation sensor oriented in said specific direction as redetermined to continue to monitor ultraviolet radiation dosage received thereafter by said object while said object remains exposed to said radiation field; and withdrawing said object from said ultraviolet radiation field in the event the dosage exceeds a predetermined threshold.

2. Apparatus for monitoring incident ultraviolet radiation dosage, comprising in combination:

sensor means for detecting ultraviolet radiation and providing an electrical output representative of the level thereof;

electronic processing means responsive to said sensor means output for providing at least first and second outputs, said first output being representative of radiation power and said second output being representative of radiation energy; and display means responsive to said first and second outputs of said processing means for displaying said first and second outputs;

said display means further including:

a first display region and a second display region, with said second display region being located in visual proximity of said first display region and wherein said display means displays said processing means first output in said first display region and said processing means second output in said second display region; and means for displaying a distinct display output responsive to said second output attaining a predetermined radiation energy threshold to signify an alarm condition.

3. The invention as defined in claim 2 wherein said sensor means comprises: photodiode means, said photodiode means having a sensitivity limited to a combined band of radiation wavelengths of radiation that cause skin cancer, premature skin aging and wrinkling, erythema, eye cataracts, solar retinitis and corneal dystrophies, including wavelengths between 250 and 400 nanometers.

4. The invention as defined in claim 2 further comprising: unitary housing means for supporting said sensor means, said electronic processing means and said display means in a unitary assembly.

5. The invention as defined in claim 4, wherein said unitary housing means includes:

a case; said case having top and bottom sides with an opening on said top side and another opening on said bottom side and having an internal cavity for receiving therewithin said sensor means, said processing means and said display means;

a cover for closing said top side with said cover being generally opaque and containing first and second non-opaque windows;

said first window being transparent to light for permitting visual observation of said display means; and said second window being transparent to ultraviolet light for permitting external ultraviolet light radiation to reach said sensor means; and a back cover for closing said bottom end.

6. The invention as defined in claim 4 wherein said unitary housing means includes:

a case; said case having top and bottom sides with an opening on said top side and another opening on said bottom side and having an internal cavity of generally circular shape for receiving therewithin said sensor means, said processing means and said display means;

a cover for closing said top side with said cover being generally opaque and containing first and second non-opaque windows;

said first window being transparent to light for permitting visual observation of said display means; and said second window being transparent to ultraviolet light for permitting external ultraviolet light radiation to reach said sensor means; and a back cover for closing said bottom end;

ring seal means sandwiched between said back cover and said case for inhibiting entry of moisture into said case; and wherein said invention further includes:

circuit board means positioned within said case for supporting said sensor in a position underlying said second window and said display means in a position underlying said first window; and wherein said display means includes:

liquid crystal display means for producing visual displays and piezoelectric sounder means for producing audio displays;

said piezoelectric sounder means being of a wafer shape;

battery means for supplying DC current, said battery means being of a pill shape geometry;

spring contact means for providing electrical connection between said circuit board and said piezoelectric sounder means to complete an electrical circuit therebetween;

fixture support bracket means forming a cavity for receiving said piezoelectric sounder means and for supporting said circuit board means within said case over said bracket cavity with said spring contact means and said battery means sandwiched therebetween; and a plurality of switch means each containing a push button; said switch means being located spaced about the periphery of said case.

7. Apparatus for monitoring incident radiation dosage, comprising in combination:

sensor means for detecting radiation and providing an electrical output representative of the level thereof;

electronic processing means responsive to said sensor means output for providing at least first and second outputs, said first output being representative of radiation power and said second output being representative of radiation energy; and display means responsive to said first and second outputs of said processing means for displaying said first and second outputs;

said electronic processing means further comprises:

amplifier means, said amplifier means being coupled to said sensor means for electronically amplifying the output of said sensor means;

analog to digital converter means, said analog to digital converter means being coupled to said amplifier means output for converting said signal into digital form useable by a microprocessor;

microprocessor means, with said microprocessor means containing a read only memory and a random access memory, input means and output means;

display driver means coupled to an output of said microprocessor means; said display driver means including LCD driver means and piezoelectric driver means;

key means coupled to an input of said microprocessor means for entering information into said microprocessor means; said key means including:

first user operable key means for initiating display of a menu of selectable choices on said display means; and second user operable key means for selecting one of a plurality of selectable choices displayed in a menu displayed on said display means;

said microprocessor means further providing an output for displaying at least one menu on said display means responsive to operation of said first user operable key means;

means for calculating power level responsive to said sensor output and outputting said calculated power level to said display means; and means for calculating energy responsive to said sensor output and outputting said calculated energy information to said display means.

8. The invention as defined in claim 7 wherein said key means further comprises: third user operable key means for changing scale units in said display means and further comprising:

circuit board means for supporting said sensor means and said display means; and wherein said display means includes:

liquid crystal display means for producing visual displays and piezoelectric sounder means for producing audio displays;

with said piezoelectric sounder means being of a wafer shape;

battery means for supplying DC current, said battery means being of a pill shape geometry;

spring contact means for providing electrical connection between said circuit board and said piezoelectric sounder means to complete an electrical circuit therebetween;

fixture support bracket means forming a cavity for receiving said piezoelectric sounder means and for supporting said circuit board means over said cavity with said spring contact means and said battery means sandwiched therebetween; and wherein each of said key means contains a push button; with said key means being located spaced about the periphery of said case.

9. Apparatus for monitoring incident radiation dosage, comprising in combination:

sensor means for detecting radiation and providing an electrical output representative of the level thereof;

electronic processing means responsive to said sensor means output for providing at least first and second outputs, said first output being representative of radiation power and said second output being representative of radiation energy; and display means responsive to said first and second outputs of said processing means for displaying said first and second outputs; said display means including:

a first display region and a second display region, with said second display region being located in visual proximity of said first display region and wherein said display means displays said processing means first output in said first display region and said processing means second output in said second display region said display means comprising liquid crystal display means and wherein said first display region comprises a bar graph type display and said second display region comprises a multi-segment numeric display.

10. Apparatus for monitoring incident radiation dosage, comprising in combination:
sensor means for detecting radiation and providing an electrical output representative of the level thereof;
electronic processing means responsive to said sensor means output for providing at least first and second outputs, said first output being representative of radiation power and said second output being representative of radiation energy; and
display means responsive to said first and second outputs of said processing means for displaying said first and second outputs;
said electronic processing means further comprising:
amplifier means, said amplifier means being coupled to said sensor means for electronically amplifying the output of said sensor means;
analog to digital converter means, said analog to digital converter means being coupled to said amplifier means output for converting said signal into digital form useable by a microprocessor;
microcontroller means, with said microcontroller means containing input means and output means;
display driver means coupled to an output of said microcontroller means; said display driver means including LCD driver means and piezoelectric driver means;
key means coupled to an input of said microcontroller means for entering information into said microcontroller means; said key means including at least:
first user operable key means for initiating display of a menu of selectable choices on said display means; and
second user operable key means for selecting one of a plurality of selectable choices displayed in a menu displayed on said display means;
said microcontroller means providing an output for displaying at least one menu on said display means responsive to operation of said first user operable key means; and including means for calculating power level responsive to said sensor output and outputting said calculated power level to said display means; and means for calculating energy responsive to said sensor output and outputting said calculated energy information to said display means.

11. An improved Uv dosimeter of the type containing sensor means for detecting light radiation in the ultraviolet light spectrum and providing an electrical signal representative thereof; first display means for providing a display indicative of light intensity received by said sensor means; and controller means having an input coupled to said sensor and an output coupled to said display means for monitoring said sensor output and providing an appropriate output to said display means representative of the light intensity received by said sensor means; the improvement comprising in combination:
second display means coupled to said controller means;
said controller means includes means for calculating dosage level responsive to light level detected by said sensor means, and with said controller means output being coupled to said second display means for providing an input thereto representative of dosage level, whereby said second display means provides a dosage level indication; and
means mounting said first display means and said second display means for permitting simultaneous viewing of both said display means.

12. The invention as defined in claim 11 wherein each of said display means comprises visual display means.

13. The invention as defined in claim 12 wherein said second display means further comprises audible display means.

14. The invention as defined in claim 11 wherein said second display means comprises at least a numeric indicator and wherein said first display means comprises a bar graph, comprising multiple segments, whereby an indication of intensity is represented in said bar graph by the number of segments activated.

15. The invention as defined in claim 14 wherein said bar graph comprises an arcuately curved bar.

16. The invention as defined in claim 15 wherein said arcuately curved bar is formed of a series of short straight segments spaced from one another.

17. The invention as defined in claim 15 wherein said accurately curved bar is positioned with the concave portion facing said second display means and with said second display means being located overlying the axis of said curved surface.

18. The invention as defined in claim 11 wherein said second display means includes visual display means and audio display means.

19. The invention as defined in claim 18 wherein said visual display means comprise liquid crystal display means.

20. The invention as defined in claim 18 wherein said controller means produces an output to activate said audio display means only upon attainment of a predetermined dosage measurement.

21. The invention as defined in claim 11 further comprising:
first user operable switch means for initiating display of the kind of selection information as may be selected by the user for input to said controller means;
second user operable switch means for permitting input of selection information to said controller means subsequent to actuation of said first user operable switch means.

22. The invention as defined in claim 11 wherein said controller means comprises: programmed digital microprocessor means.

23. The invention as defined in claim 11 wherein said controller means comprises: programmed computer means.

24. A radiation monitor comprising:
sensor means for detecting incident ultraviolet light radiation and providing an electrical output signal representative of the intensity thereof;
means responsive to said sensor means output for simultaneously displaying said light radiation intensity and displaying cumulative radiation received; said means including:

microcomputer means, said microcomputer means including at least one input means, at least one output means, random access memory means and read only memory means;

said read only memory means containing a plurality of menus for display on said display means with said menus presenting items for selection;

display means;

said display means being of the liquid crystal type and including a plurality of displays, said plurality of displays including:

at least one multi-segment multi-digit indicator for displaying numeric values;

a plurality of discrete visual indicators and associated indicium for providing display of on or off status of a menu associated with said indicium;

at least one analog indicator; and annunciator means for producing an audible alarm;

user operable key means for inputting user information into said microprocessing means; said key means including:

mode key means for initiating display of and scrolling between different ones of said plurality of menus;

set key means for entering selection information from within a displayed menu; and scale key means for selecting alternative units of measure in which said energy information is displayed;

said microcomputer means including means for determining said predetermined threshold level of cumulative radiation based on information input by said set key means and being responsive to said cumulative radiation attaining said predetermined threshold level for initiating operation of said annunciator means and having a normal mode in which mode cumulative radiation information is output to said numeric indicator for view by the user.

25. The invention as defined in claim 24 wherein said plurality of menus comprising:

a skin type menu for querying as to a number representative of the users skin type;

an alarm reset menu for displaying selections of on or off condition for said annunciator;

a reset menu for displaying a selection of affirmative or negative in respect of resetting the session dosage information stored in said random access memory to zero;

a memory reset menu for displaying a selection of affirmative or negative in respect of resetting the historical dosage information stored in said random access memory to zero.

26. The invention as defined in claim 25 wherein said plurality of menus further comprises:

a sun protection factor menu for querying for a number representative of sun screen factor of lotion to be used by user.

27. The invention as defined in claim 26 further comprising:

means responsive to first operation of said mode key means for displaying a first menu containing a plurality of numbered positions with a cursor positioned at a first one of said plurality of positions and for energizing said Skin Type indicator;

means responsive to sequential operation of said set key during display of said first menu for scrolling said cursor through different positions in said first menu representative of different skin types;

means responsive to a second sequential operation of said mode key means for inputting information into said processing represented by the last displayed cursor position in the prior menu, extinguishing said Skin Type indicator and displaying a second menu with a plurality of positions representative of sun screen factor and for energizing said SPF indicator;

means responsive to sequential operations of said set key during display of said second menu for scrolling through different positions of said second menu representative of different skin screen factors;

means responsive to a third sequential operation of said mode key for inputting information into said processor means represented by the last display in said second menu means for displaying a third menu and for energizing said Alarm indicator;

means responsive to sequential operation of said set key for scrolling said cursor through different positions in said third menu representative of either on or off condition for said alarm;

means responsive to a fourth sequential operation of said mode key for extinguishing said Alarm indicator, inputting information represented by the last display of said third menu, displaying a fourth menu containing the cumulative dosage of radiation stored in random access memory and energizing said Reset indicator;

means responsive to sequential operation of said set key during display of said fourth menu for resetting said cumulative dosage count to zero and adding said cumulative dosage count to the historical dosage count stored in memory;

means responsive to a fifth sequential operation of said mode key for extinguishing said Reset indicator and returning said display means to said normal mode of display.

28. The invention as defined in claim 24, further comprising:

means responsive to a first operation of said scale key for providing a display represented in units of percent of exposure level;

means responsive to a second sequential operation of said scale key for providing a display of cumulative energy in terms of milli-joules per square centimeter; and means responsive to a third sequential operation of said scale key for returning to said initial display of session dosage in units of milli-joules per square centimeter.

29. The invention as defined in claim 27, further comprising:

means responsive to a first operation of said scale key for providing a display represented in units of per cent of exposure level;

means responsive to a second sequential operation of said scale key for providing a display of cumulative energy in terms of milli-joules per square centimeter; and means responsive to a third sequential operation of said scale key for returning to said initial display of session dosage in units of milli-joules per square centimeter.

30. The invention as defined in claim 24 wherein said menus are of the plural type for displaying items available in said menu simultaneously.

31. The invention as defined in claim 24 wherein said menus are of the serial type and display available items in sequence in response to operation of said set key means.

32. The invention as defined in claim 24 further including means for determining and displaying the SPF level at which the monitored dosage represents a maximum exposure level based on said selected skin type.

33. The invention as defined in claim 24 wherein said display means further includes a second numeric indicator; and further comprising: means responsive to said dosage measured and said selected skin type for displaying on said second numeric indicator an SPF rating at which said dosage represents a maximum exposure level; said means, including: means for correlating for each of a plurality of Skin types and various radiation dosage levels with the SPF rating at which the respective dosage level for such skin type constitutes a maximum exposure level.

34. The invention as defined in claim 24 wherein said microcomputer includes means for outputting power level information for display on said analog indicator.

35. The invention as defined in claim 34 wherein said analog indicator comprises a bar graph type indicator; and further comprising: battery means for providing a source of direct current; and means for indicating the status of said battery means.

36. Apparatus for monitoring exposure to ultraviolet radiation, comprising in a unitary assembly:
sensor means for providing an output responsive to radiant ultraviolet energy incident thereon;
intensity monitoring and display means responsive to said sensor means output for indicating intensity of ultraviolet energy incident on said sensor means;
dosage monitoring and display means responsive to said sensor means output for indicating cumulative dosage received of said ultraviolet energy;
said dosage monitoring and display means, including:
settable alarm means for providing an alarm indication responsive to said cumulative dosage attaining a predetermined threshold level; and
user operable means for setting said predetermined threshold level.

* * * * *